United States Patent
Munukur et al.

(10) Patent No.: US 8,280,598 B2
(45) Date of Patent: Oct. 2, 2012

(54) MOTOR TORQUE MANAGEMENT ASSOCIATED WITH AUDIBLE NOISE FOR A HYBRID POWERTRAIN SYSTEM

(75) Inventors: Rama Munukur, Hillsboro, OR (US); Goro Tamai, West Bloomfield, MI (US); Sean W. McGrogan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 630 days.

(21) Appl. No.: 12/503,968

(22) Filed: Jul. 16, 2009

(65) Prior Publication Data

US 2011/0015813 A1      Jan. 20, 2011

(51) Int. Cl.
  *B60W 10/08* (2006.01)
  *B60W 10/06* (2006.01)

(52) U.S. Cl. ......... 701/54; 701/60; 701/99; 180/65.285; 180/65.28

(58) Field of Classification Search ................ 180/65.21
See application file for complete search history.

(56) References Cited

U.S. PATENT DOCUMENTS

| | | | | |
|---|---|---|---|---|
| 5,967,940 A * | 10/1999 | Yamaguchi | | 477/107 |
| 6,832,148 B1 * | 12/2004 | Bennett et al. | | 701/54 |
| 7,222,004 B2 * | 5/2007 | Anderson | | 701/22 |
| 7,632,212 B2 * | 12/2009 | Yamanaka et al. | | 477/107 |
| 7,904,230 B2 * | 3/2011 | Niimi | | 701/102 |
| 8,013,556 B2 * | 9/2011 | Hattori et al. | | 318/433 |
| 2004/0127326 A1 * | 7/2004 | Tajima et al. | | 477/3 |
| 2005/0080523 A1 * | 4/2005 | Bennett et al. | | 701/22 |
| 2005/0241868 A1 * | 11/2005 | Hommi et al. | | 180/197 |
| 2005/0256631 A1 * | 11/2005 | Cawthorne et al. | | 701/99 |
| 2006/0173593 A1 * | 8/2006 | Anderson | | 701/36 |
| 2007/0298928 A1 * | 12/2007 | Yamanaka et al. | | 477/15 |
| 2008/0004780 A1 * | 1/2008 | Watanabe et al. | | 701/54 |
| 2008/0120011 A1 * | 5/2008 | Iwase et al. | | 701/102 |
| 2009/0088913 A1 * | 4/2009 | Oyama et al. | | 701/22 |
| 2009/0118969 A1 * | 5/2009 | Heap et al. | | 701/102 |
| 2009/0146589 A1 * | 6/2009 | Hattori et al. | | 318/400.02 |
| 2009/0265075 A1 * | 10/2009 | Niimi | | 701/102 |

FOREIGN PATENT DOCUMENTS

JP   2007022296 A   *   2/2007
JP   2007045238 A   *   2/2007

* cited by examiner

*Primary Examiner* — Shelley Chen

(57) ABSTRACT

A method for operating a hybrid powertrain system includes monitoring operation of the torque machine, and limiting the motor torque output from the torque machine to a maximum allowable motor torque that is associated with an acceptable audible noise level when the motor speed of the torque machine is within a motor speed range associated with objectionable audible noise.

2 Claims, 3 Drawing Sheets

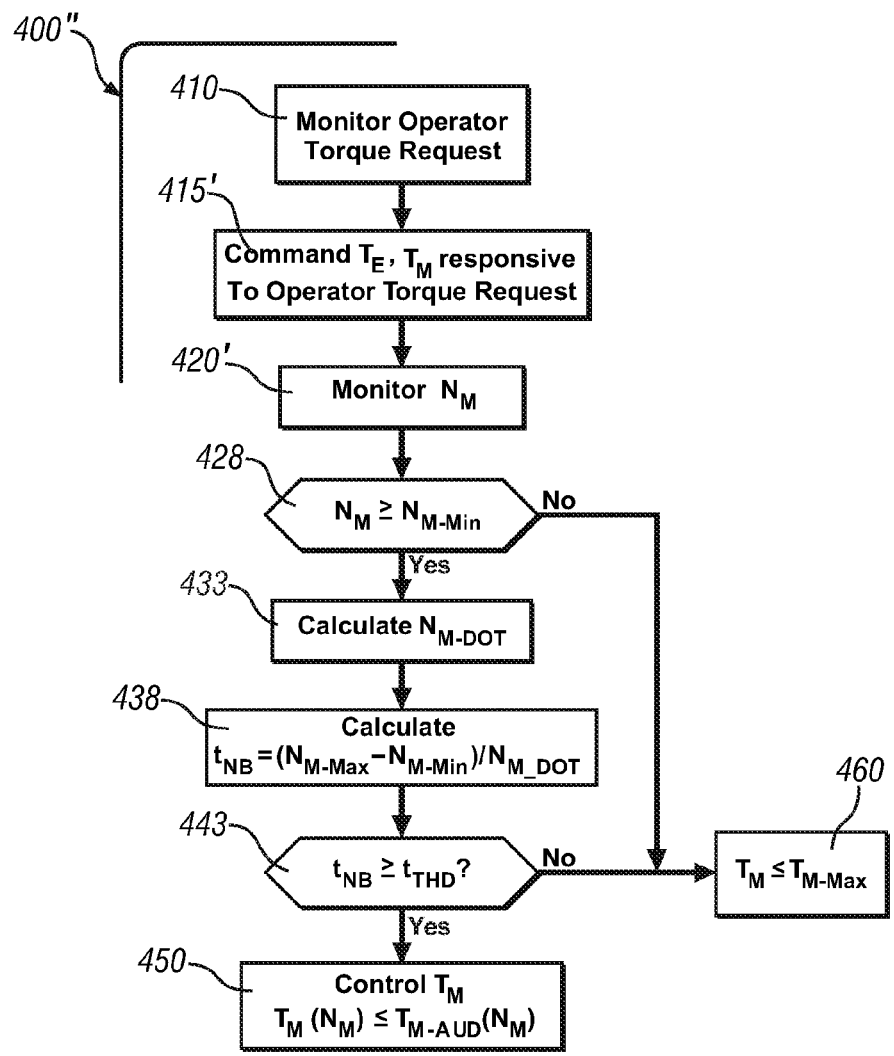
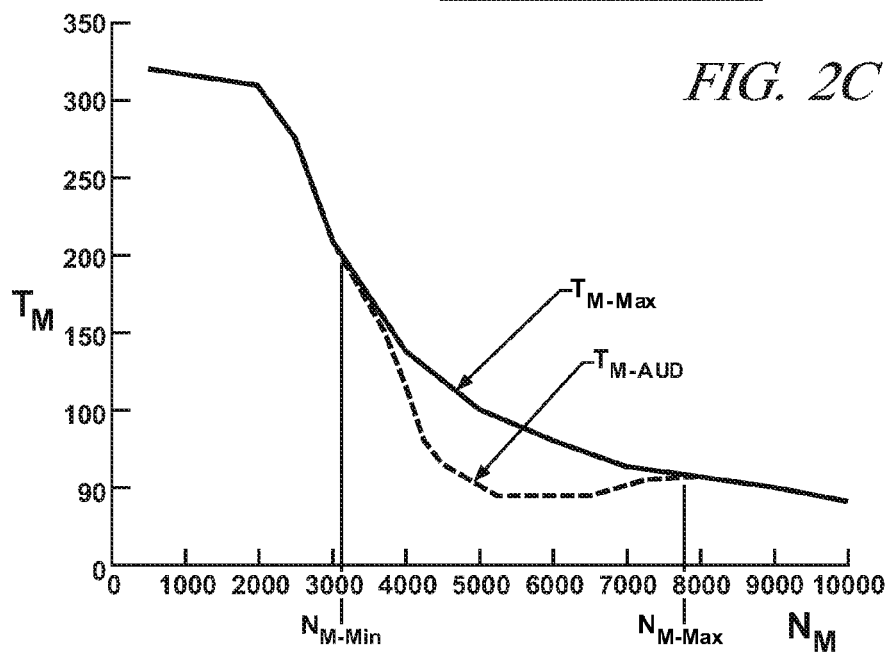
FIG. 2C
FIG. 3

MOTOR TORQUE MANAGEMENT ASSOCIATED WITH AUDIBLE NOISE FOR A HYBRID POWERTRAIN SYSTEM

TECHNICAL FIELD

This disclosure pertains to control systems for operation of a hybrid powertrain system.

BACKGROUND

The statements in this section merely provide background information related to the present disclosure and may not constitute prior art.

Known hybrid powertrain architectures include torque-generative devices including internal combustion engines and torque machines that can be mechanically coupled to a transmission device to transfer torque to an output member. Known torque machines transform stored energy to power to generate torque. Known control strategies for operating a hybrid powertrain system include executing power management schemes to achieve preferred targets associated with fuel consumption, emissions, and stored energy usage while meeting operator requests for output torque.

Known power management schemes for controlling operation of hybrid powertrain systems monitor present conditions and generate instantaneous control signals to control actuators of the powertrain system.

One known hybrid powertrain system includes an internal combustion engine coupled to an input member of a two-mode, compound-split, electro-mechanical transmission having an output member operatively coupled to a driveline of a motor vehicle for transferring tractive torque thereto. Torque machines including electric machines operate as motors or generators and can generate and transfer input torque to the transmission independently of a torque input from the internal combustion engine. The electric machines may transform vehicle kinetic energy transferred through the vehicle driveline to electrical energy that is storable in an electrical energy storage device. A control system monitors various inputs from the vehicle and the operator and provides operational control of the hybrid powertrain, including controlling transmission range state and gear shifting, controlling the torque-generative devices, and regulating the electrical power interchange among the electrical energy storage device and the electric machines to manage outputs of the transmission, including torque and rotational speed.

Known torque machines, including electric machines, can generate audible noise during operation. One audible noise generated by an electric machine is described as a whistling noise. The audible noise can vary over operating conditions of speed and torque output of the torque machines. The audible noise can be objectionable to an operator. Known methods for managing and attenuating the electric machine noise can include adding noise-damping materials and redesigning the machine, including changing magnet structures and changing bearing designs. The audible noise can be noticed with torque machines used to generate tractive or propulsion torque, as they are used to generate maximum torque outputs over a range of machine speeds.

SUMMARY

A method for operating a hybrid powertrain system having a torque machine configured to transfer torque to an output member includes monitoring motor torque output from the torque machine and the motor speed of the torque machine, and limiting the motor torque output from the torque machine to a maximum allowable motor torque associated with an acceptable audible noise level when the motor speed of the torque machine is within a motor speed range associated with objectionable audible noise.

BRIEF DESCRIPTION OF THE DRAWINGS

One or more embodiments will now be described, by way of example, with reference to the accompanying drawings, in which:

FIGS. 2A, 2B, and 2C schematically show control schemes for a control system of the exemplary hybrid powertrain in accordance with the present disclosure; and FIG. 3 is a graphical depiction of output torque and speed for an exemplary torque machine in accordance with the present disclosure.

DETAILED DESCRIPTION

Figure 1:
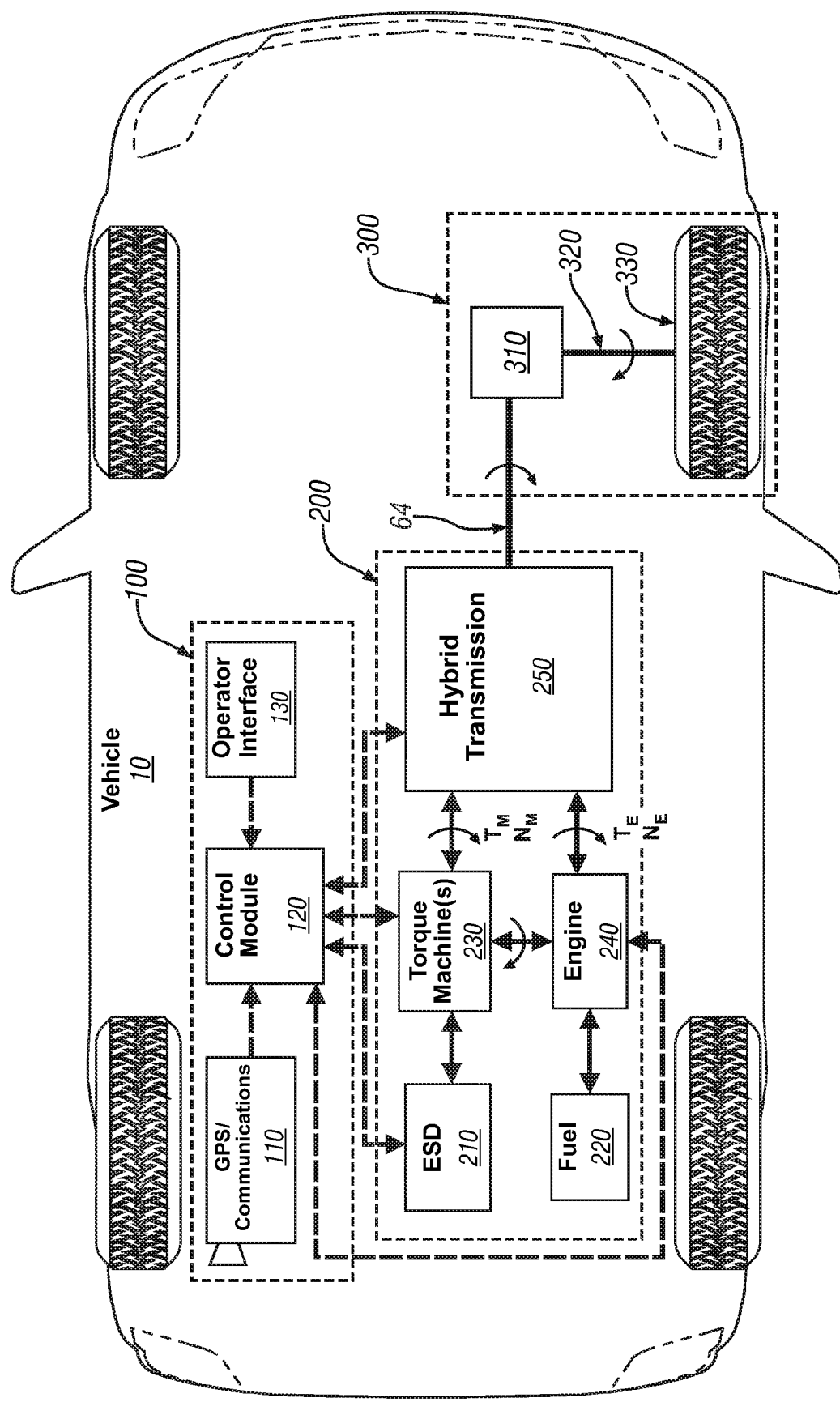
FIG. 1 is a schematic diagram of an exemplary hybrid powertrain in accordance with the present disclosure.

Referring now to the drawings, wherein the showings are for the purpose of illustrating certain exemplary embodiments only and not for the purpose of limiting the same, FIG. 1 schematically shows a vehicle 10 including a control system 100, a hybrid powertrain system 200, and a driveline 300. Like numerals refer to like elements in the description.

The driveline 300 can include a differential gear device 310 that mechanically couples to an axle 320 or half-shaft that mechanically couples to a wheel 330 in one embodiment. The differential gear device 310 is coupled to an output member 64 of the hybrid powertrain system 200. The driveline 300 transfers tractive power between the hybrid transmission 250 and the road surface.

The hybrid powertrain system 200 includes an energy storage device (ESD) 210 that stores potential energy and is coupled to one or more torque machine(s) 230 to transfer power therebetween. When the ESD 210 includes an electrical storage device and the torque machine(s) 230 include electric motor/generators, controllable power inverter(s) can be placed therebetween and used to transform electric power. The torque machine(s) 230 convert stored energy to mechanical power and convert mechanical power to energy that can be stored in the ESD 210. The engine 240 converts fuel stored in a fuel tank 220 to mechanical power. Mechanical power from the engine 240 can be transferred to the hybrid transmission 250 and the torque machine(s) 230. Mechanical power from the torque machine(s) 230 can be transferred to the hybrid transmission 250 and the engine 240. Mechanical power from the hybrid transmission 250 can be transferred to the engine 240, the torque machine(s) 230 and the driveline 300 via the output member 64. Preferably, the engine 240 is selectively operative in a plurality of states, including one of an engine-on state and an engine-off state, one of an all-cylinder state and a cylinder deactivation state, and one of a fueled state and a fuel cutoff state. Preferably, the hybrid transmission 250 is selectively operative in one of a plurality of range states including fixed gear and continuously variable range states. The torque machine(s) 230, engine 240 and hybrid transmission 250 each include a plurality of sensing devices for monitoring operation thereof including rotational position sensors, e.g., resolvers, for monitoring rotational position and speed of each of the torque machine(s) 230. The torque machine(s) 230, engine 240 and hybrid transmission 250 include a plurality of actuators for controlling operation thereof. Alternatively, torque machine(s) can be directly connected to individual wheels of the vehicle in the form of wheel motors.

The control system 100 includes a control module 120 that is signally connected to an operator interface 130 and signally connected to a GPS/communications system 110. The GPS/communications system 110 preferably includes extra-vehicle communications capability and a 3-D geographic information system (GIS) digital map system. The operator interface 130 includes a plurality of human/machine interface devices through which the vehicle operator commands operation of the vehicle 10, including an accelerator pedal, a brake pedal, and a transmission range selector (PRNDL).

The vehicle operator communicates an output torque command including an operator torque request, a direction of vehicle travel, i.e., forward or reverse, and a preferred range state for the hybrid transmission 250 through the accelerator pedal, the brake pedal, and the transmission range selector. The operator interface 130 can further include an interface to an on-board navigation system that interacts with the GPS/communications system 110.

The control module 120 is signally connected to the sensing devices of each of the torque machine(s) 230, the engine 240, the hybrid transmission 250, and the ESD 210 to monitor operation and determine parametric states thereof. Monitored states of the ESD 210 preferably include instantaneous current flow and temperature when the ESD 210 includes an electrical energy storage device. The control module 120 calculates a parametric state of the ESD 210 indicative of the capacity of the ESD 210 to transfer power to the torque machine(s) 230. The parametric state of the ESD 210 includes a state-of-charge (SOC) when the ESD 210 is an electrical energy storage device. Monitored states of the engine 240 preferably include engine speed ($N_E$), engine torque ($T_E$) or load, and temperature. Monitored states of the hybrid transmission 250 preferably include rotational speed, and hydraulic pressure at a plurality of locations, from which parametric states including application of specific torque transfer clutches can be determined Monitored states of the torque machine(s) 230 preferably include speed(s) ($N_M$) and power flow(s), e.g., electric current flow, from which a parametric state for motor torque(s) ($T_M$) output from the torque machine(s) 230 can be determined The control module 120 is operatively connected to the actuators of each of the torque machine(s) 230, the engine 240, and the hybrid transmission 250 to control operation thereof in accordance with executed control schemes that are stored in the form of algorithms and calibrations. The actuators associated with the torque machine(s) 230 preferably include inverter modules. The actuators associated with the engine 240 preferably include, e.g., fuel injectors, air flow controllers, spark ignition systems, and other known devices associated with controlling engine operation including controlling engine states. The actuators associated with the hybrid transmission 250 include solenoid devices for actuating torque transfer clutches to effect operation in specific range states.

The control module 120 preferably includes one or more general-purpose digital computers, each including a microprocessor or central processing unit, storage mediums including read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. The control module 120 has a set of control algorithms, including resident program instructions and calibrations stored in one of the storage mediums and executed to provide desired functions. Information transfer to and from the control module 120 can be accomplished by way of a direct connection, a local area network bus and a serial peripheral interface bus. The algorithms of the control schemes are executed during preset loop cycles such that each algorithm is executed at least once each loop cycle. Algorithms stored in the non-volatile memory devices are executed by the central processing unit to monitor inputs from the sensing devices and execute control and diagnostic routines to control operation of actuators associated with elements of the hybrid powertrain system 200 using calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

A control scheme for operating a hybrid powertrain system including a torque machine, e.g., a torque machine configured to transfer torque to an output member as described hereinabove, includes monitoring torque output and rotational speed of the torque machine. The motor torque output from the torque machine is limited to an allowable motor torque output associated with an acceptable audible noise level when the motor speed of the torque machine is within a motor speed range associated with objectionable audible noise.

Figure 2A:
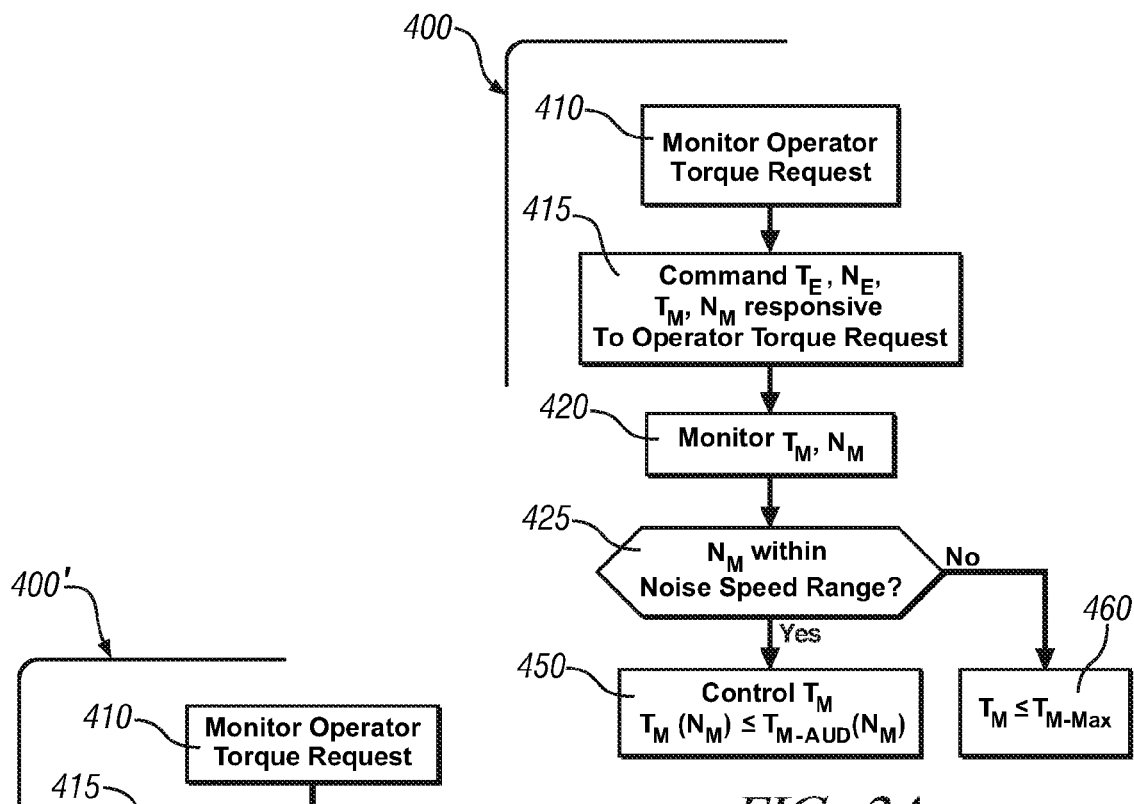

The control scheme is described with reference to FIGS. 2A, 2B, 2C and 3. FIG. 2A shows a first control scheme 400 for operating a hybrid powertrain system, e.g., the hybrid powertrain system 200 described with reference to FIG. 1. The first control scheme is periodically executed during one of the preset loop cycles to control operation of the hybrid powertrain system 200 during ongoing operation of the vehicle 10. During ongoing operation, an operator torque request for generating tractive power at the driveline 300 is monitored, preferably through the operator interface 130 (410). The control module 120 generates commands for power output from the engine 240 and the torque machine(s) 230 to transfer to the hybrid transmission 250 to transmit to the driveline 300 in response to the operator torque request (415). The engine power is described in terms of engine torque $T_E$ and engine speed $N_E$. The power output(s) from the torque machine(s) 230 is described in terms of motor torque $T_M$ and motor speed $N_M$. By way of example, when the operator requests high-speed/high load operation via an accelerator pedal, referred to as a WOT (wide-open throttle) event, the control module 120 can command the engine 240 and the torque machine(s) 230 to generate maximum achievable torques in response thereto. In one powertrain embodiment that employs an internal combustion engine and two torque machines in a two-mode compound-split hybrid powertrain arrangement, governing equations for determining output torque $T_O$ and output speed $N_O$ are as follows.

$$T_O = a*T_A + b*T_B + c*T_E \quad [1]$$

$$N_O = f(N_A, N_B, N_E) \quad [2]$$

wherein $T_A$ and $T_B$ represent motor torques, i.e., $T_M = a*T_A + b*T_B$, and $N_A$ and $N_B$ represent the motor speeds, i.e., $N_M$ from first and second torque machines 230 input to the transmission 250 and a, b, and c are scalar values. By way of example, when an operator commands a WOT event, the control scheme 400 commands maximum achievable motor torque(s) $T_M$ from at least one of the torque machines 230 and a maximum engine torque $T_E$.

FIG. 3 depicts maximum achievable motor torque ($T_{M\text{-}Max}$) over a range of motor speeds ($N_M$) for an exemplary torque machine. FIG. 3 further depicts an audible noise speed range defined by a minimum audible noise speed ($N_{M-min}$) and a maximum audible noise speed ($N_{M-Max}$). There is a maximum allowable motor torque output ($T_{M-AUD}$) associated with the maximum or threshold operator-acceptable audible noise level that corresponds to motor speed within the audible noise speed range. The maximum allowable motor torque output ($T_{M-AUD}$) associated with the maximum or threshold operator-acceptable audible noise level is associated with a maximum or threshold operator-acceptable audible noise level for the torque machine 230.

The achieved motor torque $T_M$ and motor speed $N_M$ are monitored for the torque machine(s) 230 (420). Monitoring the achieved motor torque $T_M$ can include monitoring electric current flow to the torque machine(s) 230, and monitoring motor speed $N_M$ can include monitoring signal output of sensors adapted to monitor rotational position and speed of the torque machine(s) 230.

During operation of the powertrain system, when the motor speed $N_M$ of one of the torque machine(s) 230 is within the audible noise speed range (425), the motor torque output from the torque machine(s) 230 is limited to the maximum allowable motor torque output ($T_{M-AUD}$) associated with the maximum or threshold operator-acceptable audible noise level corresponding to the present motor speed $N_M$ (450). The motor torque is limited to the maximum allowable motor torque output ($T_{M-AUD}$) associated with the maximum or threshold operator-acceptable audible noise level by controlling electric power flow to the torque machine(s) 230 when the torque machine(s) 230 includes an electric machine. Otherwise, the motor torque is limited to the commanded motor torque $T_M$ limited by the maximum achievable motor torque $T_{M-Max}$ (460).

The maximum allowable motor torque output ($T_{M-AUD}$) associated with the maximum or threshold operator-acceptable audible noise level includes a motor torque corresponding to a preferred audible noise level that is associated with operation of an exemplary torque machine 230. Audible noise level is defined as a noise level that is audibly discernible by a vehicle operator during vehicle operation, preferably characterized using a noise intensity metric measured in decibels. An objectionable audible noise level is defined as an audible noise level that is objectionable to the vehicle operator, and can be characterized as an audible noise level above a threshold determined using the noise intensity metric measured in decibels. An acceptable audible noise level is defined as an audible noise level that may be discernible but is not objectionable to the vehicle operator, and is characterized as an audible noise level at or below the threshold determined using the noise intensity metric measured in decibels. The audible noise speed range including the minimum audible noise speed ($N_{M-Min}$) and the maximum audible noise speed ($N_{M-Max}$), and the maximum allowable motor torque output ($T_{M-AUD}$) associated with the maximum or threshold operator-acceptable audible noise level and the objectionable audible noise level for an exemplary torque machine 230 and associated powertrain, driveline, and vehicle application are application-specific and can be experimentally determined during vehicle development. The allowable motor torque output relates to audible noise generated by the exemplary torque machine 230 offset by audible noise attenuation associated with powertrain, driveline and vehicle factors for an application. The maximum allowable motor torque output ($T_{M-AUD}$) associated with the maximum or threshold operator-acceptable audible noise level corresponds to motor speed $N_M$. At motor speeds greater than or less than the audible noise speed range, the audible noise output from the torque machine 230 is deemed to be unobjectionable to the vehicle operator.

Figure 2B:
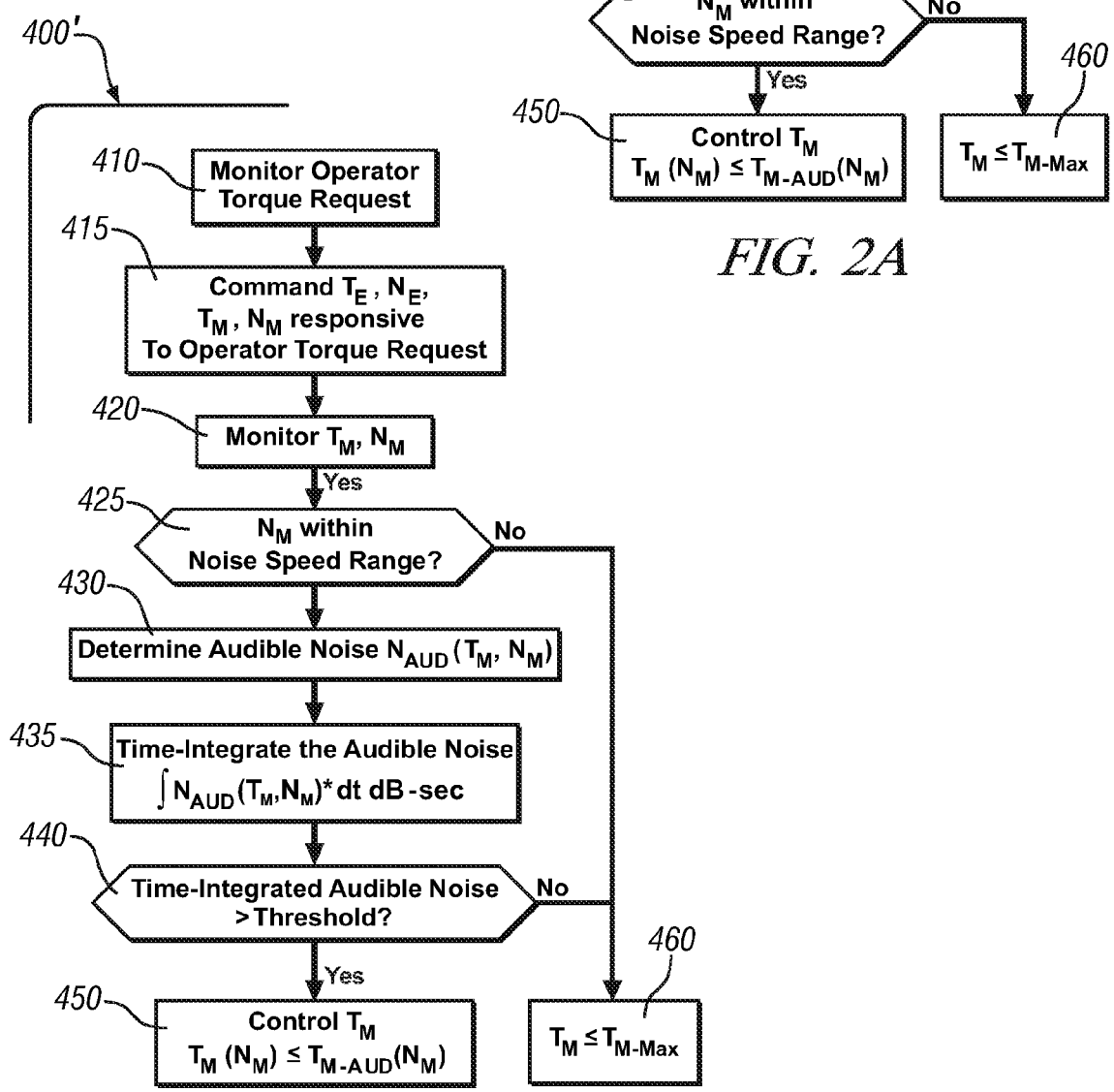

Tolerance for audible noise can be time-dependent, e.g., a short-term presence of an audible noise level may be unobjectionable, whereas a long-term presence of the audible noise level may be objectionable. Thus, FIG. 2B shows a second control scheme 400' for operating the hybrid powertrain system 200. During ongoing operation, the operator torque request for generating tractive power at the driveline 300 is monitored, preferably through the operator interface 130 (410). The control module 120 generates commands for engine power in the form of torque and speed $T_E$ and $N_E$ from the engine 240, and torque and speed $T_M$ and $N_M$ from the torque machine(s) 230 that are transferred via the hybrid transmission 250 to the driveline 300 in response to the operator torque request (415). The achieved motor torque $T_M$ and motor speed $N_M$ are monitored (420). During operation of the powertrain system, when the motor speed $N_M$ is within the audible noise speed range (425), a state of an audible noise parameter $N_{AUD}(T_M, N_M)$ corresponding to the motor torque $T_M$ and motor speed $N_M$ (430) is determined The state of the audible noise parameter $N_{AUD}(T_M, N_M)$ preferably corresponds to a noise intensity metric measured in decibels and can be predetermined experimentally. The state of the audible noise parameter $N_{AUD}(T_M, N_M)$ is integrated over elapsed time to determine a time-integrated audible noise state (435), calculated as: follows.

$$\int N(T_M, N_M) * dt \, DB\text{-sec} \quad [3]$$

The state of the audible noise parameter $N_{AUD}(T_M, N_M)$ is compared to a time-integrated audible noise threshold (integration threshold), measured in decibel-seconds (440). When the time-integrated audible noise state exceeds the threshold, the motor torque $T_M$ is limited to the maximum allowable motor torque output ($T_{M-AUD}$) associated with the maximum or threshold operator-acceptable audible noise level corresponding to the present motor speed $N_M$ (450). Otherwise, the motor torque is limited to the commanded motor torque $T_M$ which is limited by the maximum achievable motor torque $T_{M-Max}$ (460). Preferably, the state of the audible noise parameter $N_{AUD}(T_M, N_M)$ is integrated over elapsed time during continuous, uninterrupted operation of the torque machine(s) 230 within the audible noise speed range. Thus, when the motor speed $N_M$ falls outside the audible noise speed range, i.e., is less than the minimum audible noise speed ($N_{M-Min}$) or is greater than the maximum audible noise speed ($N_{M-Max}$), the time-integrated audible noise state is reset to zero. The second control scheme 400' can include hysteresis to accommodate operation of the subject torque machine(s) 230 at motor speeds near the minimum audible noise speed ($N_{M-Min}$) and the maximum audible noise speed ($N_{M-Max}$).

FIG. 2C shows a third control scheme 400'' for operating the hybrid powertrain system 200. During ongoing operation, the operator torque request for generating tractive power at the driveline 300 is monitored, preferably through the operator interface 130 (410). The control module 120 generates commands for engine power in the form of engine torque $T_E$ from the engine 240, and torque $T_M$ from the torque machine(s) 230 that are transferred via the hybrid transmission 250 to the driveline 300 in response to the operator torque request (415'). The achieved motor speed $N_M$ is monitored (420'). When the motor speed $N_M$ reaches and/or exceeds the minimum audible noise speed ($N_{M-Min}$) (428), a time-rate change in the motor speed $N_M$ is calculated ($N\_{DOT}$) (433). A predicted elapsed period time ($t_{NB}$) the torque machine(s) 230 will operate within the audible noise speed range associated with the minimum audible noise speed ($N_{M-Min}$) is calculated, the maximum audible noise speed ($N_{M-Max}$), and the time-rate change in the motor speed $N_M$ ($N_{M\_DOT}$) (438). The predicted elapsed period time ($t_{NB}$) is compared to a threshold period of time (time threshold) ($t_{THD}$) (443). When the predicted elapsed period time ($t_{NB}$) is less than the threshold period of time ($t_{THD}$), the motor torque is controlled to the commanded motor torque $T_M$ limited by the maximum achievable motor torque $T_{M-Max}$ (460). When the predicted elapsed period time ($t_{NB}$) exceeds the threshold period of time ($t_{THD}$), the motor torque $T_M$ is controlled to the maximum allowable motor torque output ($T_{M-AUD}$) associated with the maximum or threshold operator-acceptable audible noise level corresponding to the present motor speed $N_M$ (450). The threshold period of time ($t_{THD}$) is preferably a precalibrated period of time that is based upon a cumulative discomfort of the audible noise over elapsed time.

The control schemes 400, 400' and 400" each preferably includes one or more algorithms that are periodically executed during one of the preset loop cycles to control operation of the hybrid powertrain system 200. Although the elements of the control schemes 400, 400' and 400" are shown as discrete elements in FIGS. 2A, 2B and 2C, such an illustration is for ease of description and it should be recognized that the functions performed by these elements may be combined and implemented using algorithms, hardware, and/or application-specific integrated circuitry (ASIC).

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for operating a hybrid powertrain system including a torque machine configured to transfer torque to an output member, the method comprising:
    monitoring motor torque output from the torque machine and the motor speed of the torque machine;
    limiting the motor torque output from the torque machine to a maximum allowable motor torque associated with an acceptable audible noise level when the motor speed of the torque machine is within a motor speed range associated with objectionable audible noise;
    determining a state of an audible noise parameter corresponding to the motor torque output from the torque machine and the motor speed of the torque machine;
    time-integrating the state of the audible noise parameter when the motor speed of the torque machine is within the motor speed range associated with the objectionable audible noise; and
    wherein limiting the motor torque output from the torque machine to the maximum allowable motor torque associated with the acceptable audible noise level when the motor speed of the torque machine is within the motor speed range associated with objectionable audible noise is effected when the time-integrated audible noise parameter exceeds a threshold.

2. Method for operating a hybrid powertrain system including a torque machine configured to transfer torque to an output member, the method comprising:
    monitoring motor torque output from the torque machine and the motor speed of the torque machine;
    limiting the motor torque output from the torque machine to a maximum allowable motor torque associated with an acceptable audible noise level when the motor speed of the torque machine is within a motor speed range associated with objectionable audible noise;
    predicting an elapsed period of time the torque machine operates within the motor speed range associated with objectionable audible noise; and
    wherein limiting the motor torque output from the torque machine to the maximum allowable motor torque associated with the acceptable audible noise level when the motor speed of the torque machine is within the motor speed range associated with objectionable audible noise is effected when the predicted elapsed period of time exceeds a threshold.

\* \* \* \* \*